United States Patent
Van Henten et al.

(10) Patent No.: US 11,811,878 B1
(45) Date of Patent: Nov. 7, 2023

(54) SESSION MANAGER PROVIDING BIDIRECTIONAL DATA TRANSPORT

(71) Applicant: Amazon Technologies, Inc., Seattle, WA (US)

(72) Inventors: Matthijs Van Henten, Diemen (NL); Mariusz Sakowski, Hoofddorp (NL); Arron Bailiss, Amsterdam (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/710,749

(22) Filed: Mar. 31, 2022

(51) Int. Cl.
  *H04L 67/141* (2022.01)
  *H04L 67/02* (2022.01)
  *H04L 67/146* (2022.01)

(52) U.S. Cl.
  CPC ............ *H04L 67/141* (2013.01); *H04L 67/02* (2013.01); *H04L 67/146* (2013.01)

(58) Field of Classification Search
  CPC ...... H04L 67/141; H04L 67/02; H04L 67/146
  See application file for complete search history.

(56) References Cited

U.S. PATENT DOCUMENTS

| | | | |
|---|---|---|---|
| 8,755,392 B2 | 6/2014 | Traversat et al. | |
| 2011/0258614 A1* | 10/2011 | Tamm | G06F 11/3656 717/124 |
| 2015/0033078 A1* | 1/2015 | Wintergerst | G06F 11/3664 714/38.1 |
| 2017/0060571 A1* | 3/2017 | Bruso | G06F 9/44505 |
| 2018/0129580 A1* | 5/2018 | Merkle | H04L 67/02 |
| 2020/0403988 A1 | 12/2020 | Brady et al. | |
| 2022/0121426 A1* | 4/2022 | Burgmeier | H04L 67/02 |

FOREIGN PATENT DOCUMENTS

| | | | |
|---|---|---|---|
| CN | 113391796 A | * | 9/2021 |
| JP | 2014060723 | | 4/2014 |
| KR | 20190129652 | | 11/2019 |

* cited by examiner

*Primary Examiner* — Cheikh T Ndiaye
(74) *Attorney, Agent, or Firm* — S. Scott Foster; Kowert, Hood, Munyon, Rankin & Goetzel, P.C.

(57) ABSTRACT

Systems and methods for implementing direct bidirectional communications using a management console are described. A client of an application development service may request an application development resource be created. Responsive to this request, a resource may be created and the service may return an executable Integrated Development Environment (IDE) to the client to interface with the created resource. The IDE may then request an agent be executed to provide an interface between the IDE and the resource. An agent is then started and a websocket address with authorization credentials may be provided to the IDE. The IDE may then open a direct, bidirectional communications session using websockets with the agent, with the agent providing interfaces to customizable data for application development.

20 Claims, 6 Drawing Sheets

SESSION MANAGER PROVIDING BIDIRECTIONAL DATA TRANSPORT

BACKGROUND

Modern application development often relies on complex toolchains that employ large numbers of disparate tools each managing its own data, configuration, interfaces, and so on. While these tools may often be integrated together using additional software, such integrations lack the scalability needed to implement robust change control necessary to provide consistent governance of the development and deployment process. Furthermore, deploying these toolchains is often difficult, leading to challenges integrating development team members and providing consistent reproducibility. Cloud computing may provide developers a centralized service capable of mitigating many such problems.

Figure 1:
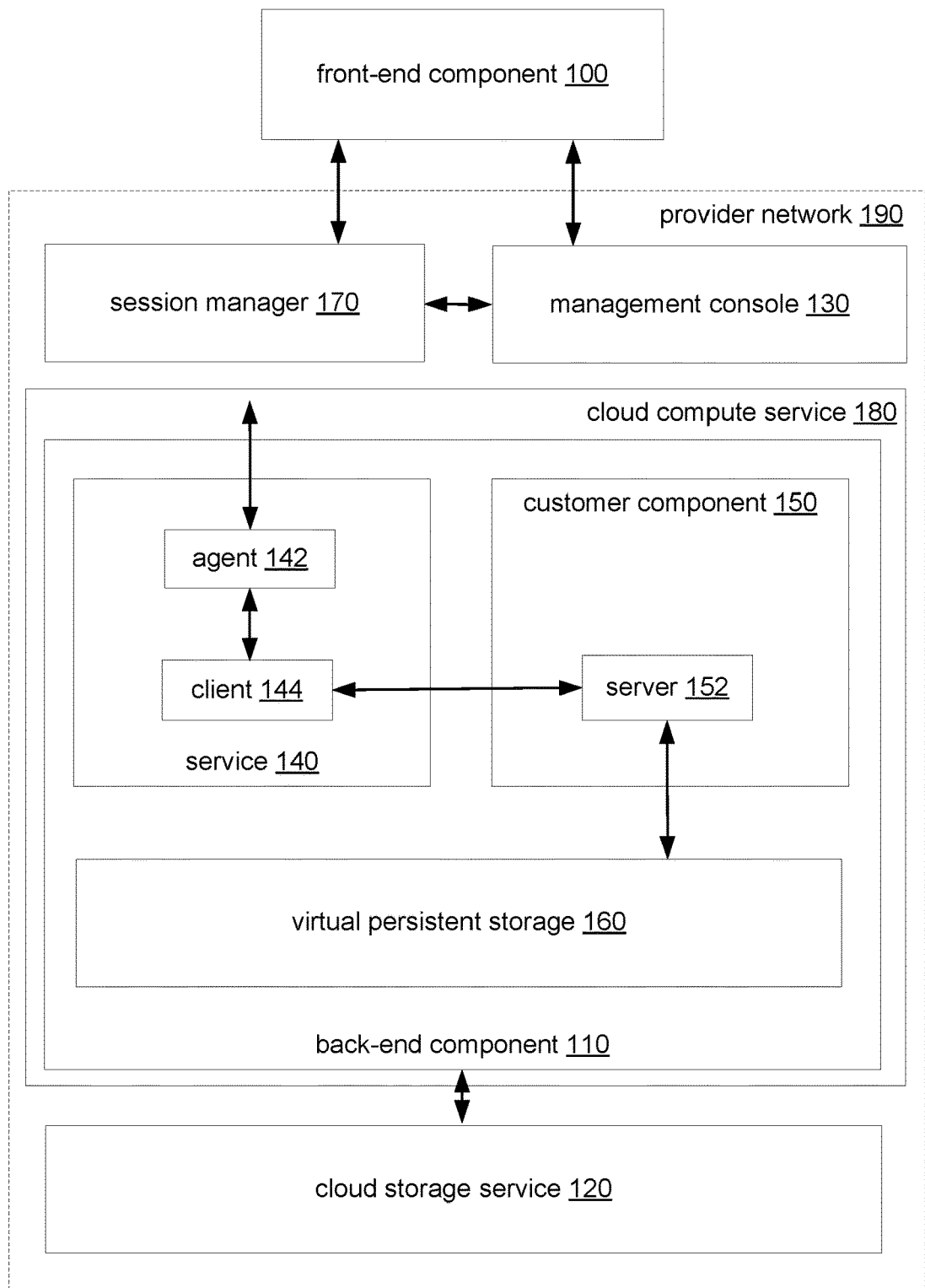
FIG. 1 is a block diagram illustrating a system including a management console providing direct, bidirectional communications between a client and agent, according to some embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Cloud-based serverless zero-configuration development environments allow developers and development teams to get started coding quickly by creating development environments from within code repositories or directly using a cloud management console.

Unlike traditional development environments which often depend on complex toolchains that employ large numbers of disparate tools without toolsets that vary from installation to installation, cloud-based developments environments may use serverless compute engines that support containers, a software packaging technology that virtually packages and isolates applications for deployment. Using these containers, developers can be assured of having a consistent development environment regardless of location and time, furthermore development teams can trivially add and subtract team members as needed to support development schedules and individual developers may switch between projects without fear of development toolchains for different projects interfering with one another.

Cloud-based development environments may be made available to developers within seconds and pre-configured with customer defined tools and libraries. This frees developers of the time-consuming process of maintaining development environments. Furthermore, developers can quickly switch between projects by swapping out environments.

To further enhance this capability, the development environment may be split into two components: a front-end user interface, where developers write and edit their code, and the back-end development environment, which executes in the cloud. These back-end environments may further be defined in definition files that may be checked in as source code in a source code management system, thus developers can define their own development environments that may evolve with the application code base.

Definition files allow customers to define various aspects of a development environment such as environment hardware (e.g. vCPUs, memory, network configuration) along with toolchains used for writing, running, and debugging software. During use, this hardware and software may be provisioned automatically for the user, and provisioning may be dynamically adjusted as needs evolve. These definition files may be editable within the IDE or updated by pulling the files from source code control.

Furthermore, developer may switch between projects merely by changing back-end development environments while retaining their front-end user interface, and different front-end user interfaces may be employed to suit a variety of needs and requirements.

FIG. 1 is a block diagram illustrating a system including a management console providing direct, bidirectional communications between a client and agent, according to some embodiments. A management console 130 may provide an interface to a back-end component 110 for a front-end component 100 that includes an ability to execute an agent 142 within a service 140 of the back-end component 110 and allow the front-end to establish direct bidirectional communications with the agent 142 via a session manager 170.

The back-end component 110 may, in some embodiments, provide service 140 to clients of a provider network 190, the back-end component 110 implemented within the provider network 190 on a cloud compute service 180 of the provider network 190. Storage for the back-end component 110 may be provided, in some embodiments, by a cloud storage service 120 of the provider network 190. The provider network 190 may, in some embodiments, provide a number of additional services (not shown) and the management console 130 may provide any number of management functions for these various provider network services.

Elements of the cloud compute service 180, as well as the management console 130, the cloud storage service 120 and the front-end component 100, may execute on any number of computing nodes. Examples of such computing nodes are discussed in further detail below in FIG. 6.

For performance reasons, the provider network 190 may implement fleets of computing nodes with various provider network function being implemented using combinations of shared and dedicated fleets of computing nodes. For this reason, in some embodiments, various components shown in FIG. 1 may be executed on different computing nodes or fleets of computing nodes. For example, the management console may execute on a dedicated fleet of computing nodes isolated from nodes implementing storage or compute services. Therefore, the management console 130 may, in some embodiments, execute on one or more computing nodes different from computing nodes execution various elements of the back-end component 110, such as the agent 142, service 140, customer component 150 or server 152. Furthermore, for similar performance reasons, in some embodiments the session manager 170 may execute on one or more computing nodes different from computing nodes executing the management console 130.

The front-end component 100 may take a variety of forms, in different embodiments. For example, the front-end component may be implemented as a set of interactive scripts that interface with the management console 130. In another example, the front-end component 100 may be an interactive shell that provides a command line interface, while in yet another example the front-end component 100 may provide a graphical user interface (GUI). In addition, the front-end component 100 may be a single application in some embodiments, while in other embodiments multiple applications could be used, where respective applications may provide different user interfaces. These examples are not intended to be limiting and any number of implementations of the front-end component 100 may be envisioned.

The service 140 of the back-end component 110 may provide any number of services to clients, in various embodiments. In a preferred embodiment, the service 140 may provide portions of a cloud-based software development service. It should be understood, however, that this example is not intended to be limiting and other services may be envisioned.

In the example of the service 140 providing portions of a cloud-based software development service, in some embodiments other portions of the cloud-based software development service may be provided by the front-end component. For example, the front-end component may provide interactive Integrated Development Environment (IDE) functions such as command interfaces, source code control interfaces and editing capabilities. In this example, it may be desirable that the front-end component act modally, i.e. when a software development session is active the front-end component 100 may offer an IDE-style interactive interface while when no software development session is active, the front-end component 100 may offer a management interface or interface suited for used with other services of the provider network 190.

The front-end component 100 may further execute within the cloud compute service 180, for example, in some embodiments by using a virtual compute service that provides virtual machines to execute client applications. In other embodiments, the front-end component 100 may execute on computing nodes external to the provider network 190. These examples are not intended to be limiting and any number of configurations to execute the front-end component 100 may be envisioned.

The front-end component 100 may also execute in a variety of ways. In some embodiments, the front-end component 100 may be implemented as a native executable application, for example as a Windows, MacOS or Linux application. In other embodiments the front-end component 100 may be distributed in an interpreted language or in a virtual machine byte code format, such as a Python or Java™ application. This may allow a single executable format to be distributed for a variety of platforms, in some embodiments.

In yet another embodiment, the front-end component 100 may execute as a web application within a web browser. This approach may have a number of advantages. First, versioning and deployment may be more easily managed. Second, the front-end component 100 may execute anywhere a web browser can be accessed, and third, distribution of the application can be centralized and customized as part of a front-end component 100 lifecycle.

For example, for a front-end component 100 executing as a web application may be deployed as part of the management console 130, thereby ensuring that the web application and management console 130 are compatible. In the example of application development service as discussed above, the web application may operate modally under control of the management console itself, thereby changing the personality of the front-end component as desired to access various services of the provider network 190. In such embodiments, when operating in a management console mode, the front-end component may be implemented as a web shell, providing a shell-like command line interface to the management console 130 while executing in a web browser.

Web applications, however, are not required in order for the front-end component 100 to implement modal behavior and the above example is not intended to be limiting. For example, a single application may contain all modal interfaces suitable to implement the various phases of the front-end component 100. In another example, different applications could signal one another to implement similar modal functionality while in yet another example, end users could managed different applications manually to implement a similar result.

In some embodiments, the service 140 may provide access for the front-end component 100 to a customized customer component 150 that is unique to the particular instance, or resource, being provided to the front-end component. In some embodiments, the customer component 150 may include a server 152 which provides access to these unique features. The access the features, the service 140 may implement a local client 144 that connects the server 152. In this way, the service 140 may be isolated from the customer component, in some embodiments, for security or packaging reasons.

The client 144 may then make available access to the customer-unique features of the customer component 150 to the agent 142 which then provides access to the features to the front-end component 100 through the session manager 170, in some embodiments.

Various resources made available to the front-end component 100 by the service 140 may have access to persistent storage through the virtual persistent storage 160 element, in some embodiments. The customer component 150 may also use virtual persistent storage 160 to implement and manage customer-specific features. The back-end component 110 may then use a cloud storage service 120 to provide persistent storage for resources provided by the service 140.

Figure 2:
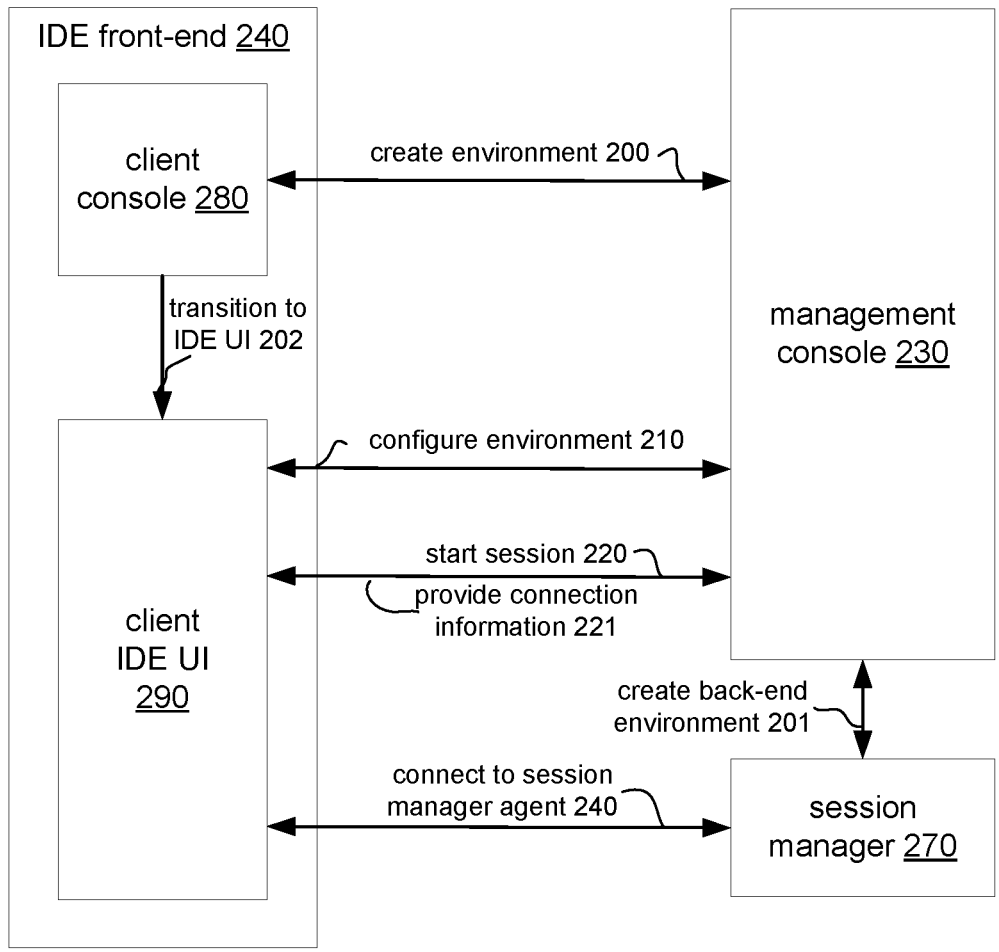
FIG. 2 is a block diagram illustrating creating and starting a development environment that provides direct, bidirectional communications between a client and agent, according to some embodiments.

FIG. 2 is a block diagram illustrating creating and starting a development environment that provides direct, bidirectional communications between a client and agent, according to some embodiments. A development environment may be implemented by an IDE front-end 240, such as the front-end component 100 as shown in FIG. 1, and a development environment back-end (not shown) such as the back-end component 110 of FIG. 1, in some embodiments. The development environment back-end may be created and started by a management console 230, such as the management console 130 as shown in FIG. 1, in some embodiments.

A client console 280 of the IDE front-end 240 may first request that a development environment be created 200. This creation request may, in some embodiments, be submitted to the management console 230. The client console 280 may, in some embodiments, be implemented as a web shell, providing a shell-like command line interface to the management console 230 while executing in a web browser. This example is not intended to be limiting, and various other implementations of the client console 280 may be envisioned.

Responsive to this request, the management console may create, or cause the creation of, a development environment resource to implement the development environment back-end, in some embodiments. This development environment resource may be created as a resource for a new development project or be created to support development of an existing development project. This creation is discussed in further detail below in FIG. 3.

As part of creation of the development environment, the management console 230 may interact with a session manager 270, such as the session manager 170 of FIG. 1, to create portions of the back-end environment 201. The management console 230 may further send notification to the IDE front-end 240 of the creation of the environment and signal to the IDE front-end 240 a transition 202 of the IDE front-end 240 from a client console 280 to a client IDE User Interface (UI) 290.

This may be accomplished in a number of ways in various embodiments. For example, the IDE front-end 240 may, in some embodiments, be implemented as a web application executing in a web browser, with the web application accessed by a Universal Resource Locator (URL) that is served by the management console 230. The client IDE UI 290 may then be implement as another web application, with the management console merely indicating to the IDE front-end 240 that a reload of the web application from the URL is required. This is merely one example, however, and is not intended to be limiting, as any number of mechanisms for implementing modal behavior in the IDE front-end 240 may be envisioned.

Upon transition to the client IDE UI 290, the IDE front-end 240 may request of the management console 230 that a number of configuration steps be performed on the environment 210. Once configuration is complete, the client IDE UI 290 may request that the management console 230 start the created and configured environment 220. In response, the management console 230 may start or cause to start the environment and provide connection information enabling a direct bidirectional communications path to be established between a management agent, such as the agent 142 as shown in FIG. 1, and the client IDE UI 290. In some embodiments, the IDE front-end 240 may execute in a web browser and the connection information may take the form of a URL with optional authorization information to allow for secure communications. This example, however, is not intended to be limiting and other connection information may be envisioned.

Once the connection information is received, the client IDE UI 290 may then establish a connection to a session manager agent 240, such as the agent 142 as shown in FIG. 1. In some embodiments, the IDE front-end 240 may execute in a web browser and the connection information may take the form of a URL with optional authorization information to allow for secure communications. The client IDE UI 290 may use this URL and optional authorization information to establish direct, bidirectional communications with the session manager agent using a websocket interface, thus avoiding communication steps, hops or proxies for individual messages communicated between the client IDE UI 290 and the session manager agent 270, in some embodiments. This example, however, is not intended to be limiting and other connection information may be envisioned.

Figure 3:
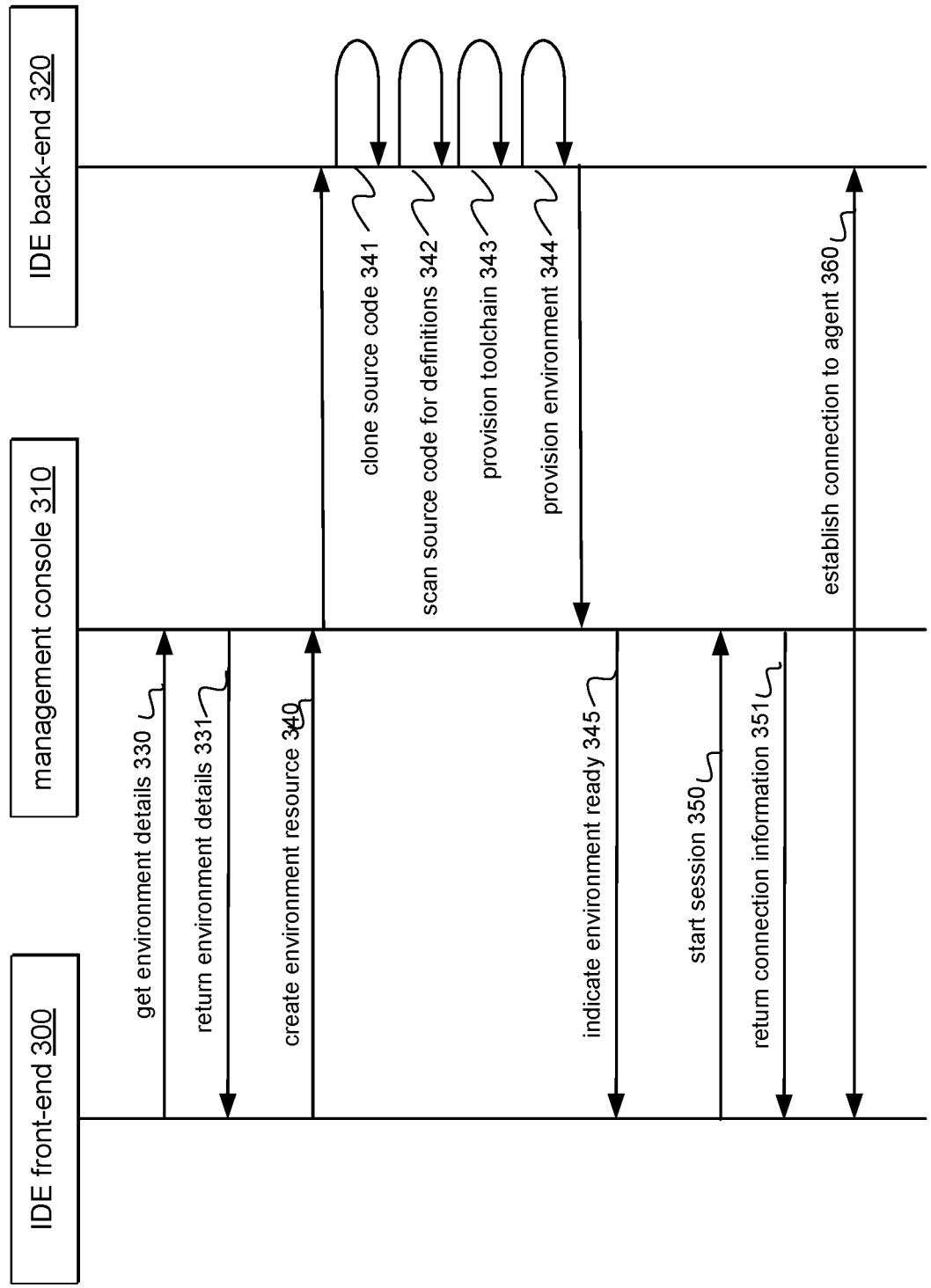
FIG. 3 is a block diagram illustrating a process flow for creating and starting a development environment that provides direct, bidirectional communications between a client and agent, according to some embodiments.

FIG. 3 is a block diagram illustrating a process flow for creating and starting a development environment that provides direct, bidirectional communications between a client and agent, according to some embodiments. An IDE front-end 300, such as the front-end component 100 as shown in FIG. 1, may first request environment details 330 from a management console 310, such as the management console 130 of FIG. 1 and these details may be returned 331 from the management console 310 to the IDE front-end 300. These details may be usable, in some embodiments, to ensure that software executing on various components of the development environment are compatible and do not need updating.

The IDE front-end 300 may then, in some embodiments, request that a development environment resource be created 340. This request may correspond to the request 200 of FIG. 2. This creation request may, in some embodiments, be submitted to the management console 310.

Responsive to this request, the management console may create, or cause the creation of, a development environment resource to implement a development environment back-end, in some embodiments, by interacting with the IDE back-end 320, such as the back-end component 110 as shown in FIG. 1. This development environment resource may be created as a resource for a new development project or be created to support development of an existing development project.

Responsive to the creation request, the IDE back-end 320 may create a development environment resource, in some embodiments. This resource may be a resource for developing a new software application using a development environment prototype or template, or the resource may be a resource for further developing an existing software application, in some embodiments. In either case, the existing environment or new environment may have associated source code accessible by the IDE back-end 320.

The IDE back-end 320 may clone this source code 341, then scan the source code 342 for definitions needed to configure the environment resource. These definitions may include, for example, hardware requirements such as processor or virtual processors, graphics accelerators, memory and network configuration and software requirements such as toolchains used for writing, running and debugging software, in some embodiments.

The IDE back-end 320 may then provision the required toolchains 343 and provision the development environment resource 344. In some embodiments, the IDE back-end create one or more containers, a software packaging technology that virtually packages and isolates applications for deployment, and use these containers as part of the provisioned development environment resource.

Once the development environment resource has been created, the management console may indicate that the environment resource is ready for use 345. The IDE front-end 300 may then request that the management console 230 start the created and configured environment 220. In response, the management console 310 may start or cause to start the development environment resource and provide connection information enabling a direct bidirectional communications path to be established between a management agent, such as the agent 142 as shown in FIG. 1, within the IDE back-end 320 and the client IDE UI 290. In some embodiments, the IDE front-end 300 may execute in a web browser and the connection information may take the form of a URL with optional authorization information to allow for secure communications. This example, however, is not intended to be limiting and other connection information may be envisioned.

Once the connection information is received, the IDE front-end 300 may then establish a connection to the agent 360, such as the agent 142 as shown in FIG. 1. In some embodiments, the IDE front-end 300 may execute in a web browser and the connection information may take the form of a URL with optional authorization information to allow for secure communications. The IDE front-end 300 may use this URL and optional authorization information to establish direct, bidirectional communications with the session manager agent using a websocket interface. This example, however, is not intended to be limiting and other connection information may be envisioned.

Figure 4:
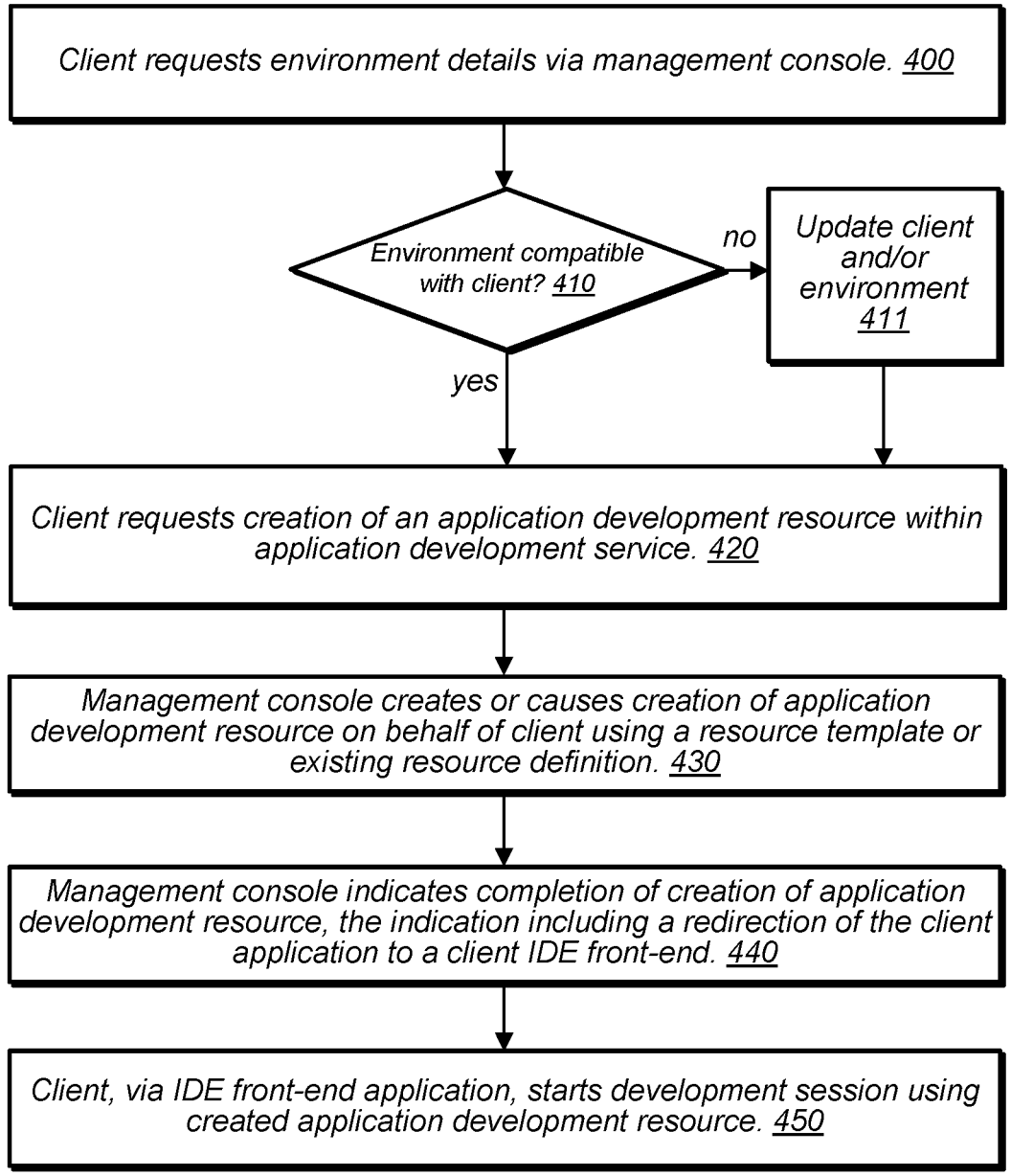
FIG. 4 is a flow diagram illustrating creating a development environment that provides direct, bidirectional communications between a client and agent, according to some embodiments.

FIG. 4 is a flow diagram illustrating creating a development environment that provides direct, bidirectional communications between a client and agent, according to some embodiments. The process begins at step 400 where a client, such as the front-end component 100 as shown in FIG. 1, may request environment details from a management console, such as the management console 130 of FIG. 1 and these details may be returned from the management console to the client. These details may be usable, in some embodiments, to ensure that software executing on various components of the development environment are compatible and do not need updating.

If the environment is not compatible with the client according to the returned details, as shown in a negative exit from 410, the process may proceed, in some embodiments, to step 411 where the client, environment, or both may be updated to ensure compatibility. The process may then proceed to step 420. If, however, the environment is compatible with the client according to the returned details, as shown in a positive exit from 410, the process may proceed directly to 420.

At step 420, the client may then request creation of an application development resource to function as an IDE back-end for the development environment, in some embodiments. This resource may be a resource for developing a new software application using a development environment prototype or template, or the resource may be a resource for further developing an existing software application, in some embodiments.

At step 430, the management console may then create, or cause the creation of, a development environment resource to implement resource, in some embodiments. To create this resource, a development environment prototype or template may be used if the resource is to be created for a new development project. Otherwise, source code for an existing project may be used or one or more previously created containers may be used to create the resource, in various embodiments. These examples are not intended to be limiting, however, and other means of creating the resource may be envisioned.

At step 440, the management console may then notify the client the completion of creation of the resource. In some embodiments, this notification may include a signal to the client to redirect or transition the client to a client IDE User Interface. This redirection or transition may be accomplished in a number of ways in various embodiments. For example, the client may, in some embodiments, be implemented as a web application executing in a web browser, with the web application accessed by a Universal Resource Locator (URL) that is served by the management console. The client may then be implemented as another web application, with the management console merely indicating to the IDE front-end 240 that a reload of the web application from the URL is required, thus redirecting the client to an IDE mode. This is merely one example, however, and is not intended to be limiting, as any number of mechanisms for implementing modal behavior in the client may be envisioned.

At step 450, the client may then, via the client IDE User Interface, start a development session using the newly created development resource. This step is discussed in further detail below in FIG. 5.

Figure 5:
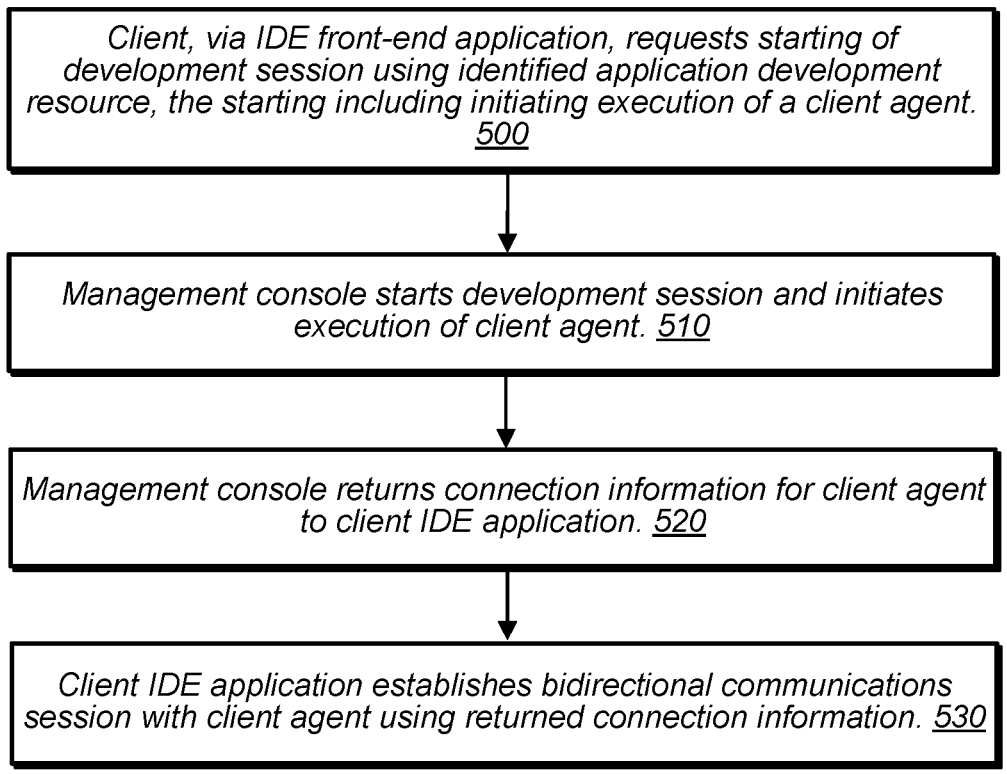
FIG. 5 is a flow diagram illustrating starting a development environment that provides direct, bidirectional communications between a client and agent, according to some embodiments.

FIG. 5 is a flow diagram illustrating starting a development environment that provides direct, bidirectional communications between a client and agent, according to some embodiments. The process begins at step 500 where a client, such as the front-end component 100 as shown in FIG. 1 may, via a client IDE User Interface serving as an IDE front-end application such as the front-end component 100 of FIG. 1, may request starting of a development session using an identified application development resource. This starting may include initiating execution of a client agent, such as the agent 142 as shown in FIG. 1.

At step 510, a management console, such as the management console 130 of FIG. 1, may then start or cause to start the development session using the identified application development resource. In addition, in some embodiments, the management console may initiate execution of the client agent.

At step 520, the management console may then, upon starting the development session, returns connection information to the client for the client agent. In some embodiments, the IDE front-end 240 may execute in a web browser and the connection information may take the form of a URL with optional authorization information to allow for secure communications. This example, however, is not intended to be limiting and any number of implementations of the connection information may be envisioned.

At step 530, the client may then use the returned connection information to establish a bidirectional communications session with the client agent. In some embodiments, the IDE front-end 240 may execute in a web browser and the connection information may take the form of a URL with optional authorization information to allow for secure communications. The client may use this URL and optional authorization information to establish direct, bidirectional communications with the session manager agent using a websocket interface, in some embodiments. This example, however, is not intended to be limiting and any number of implementations of the connection information may be envisioned.

Figure 6:
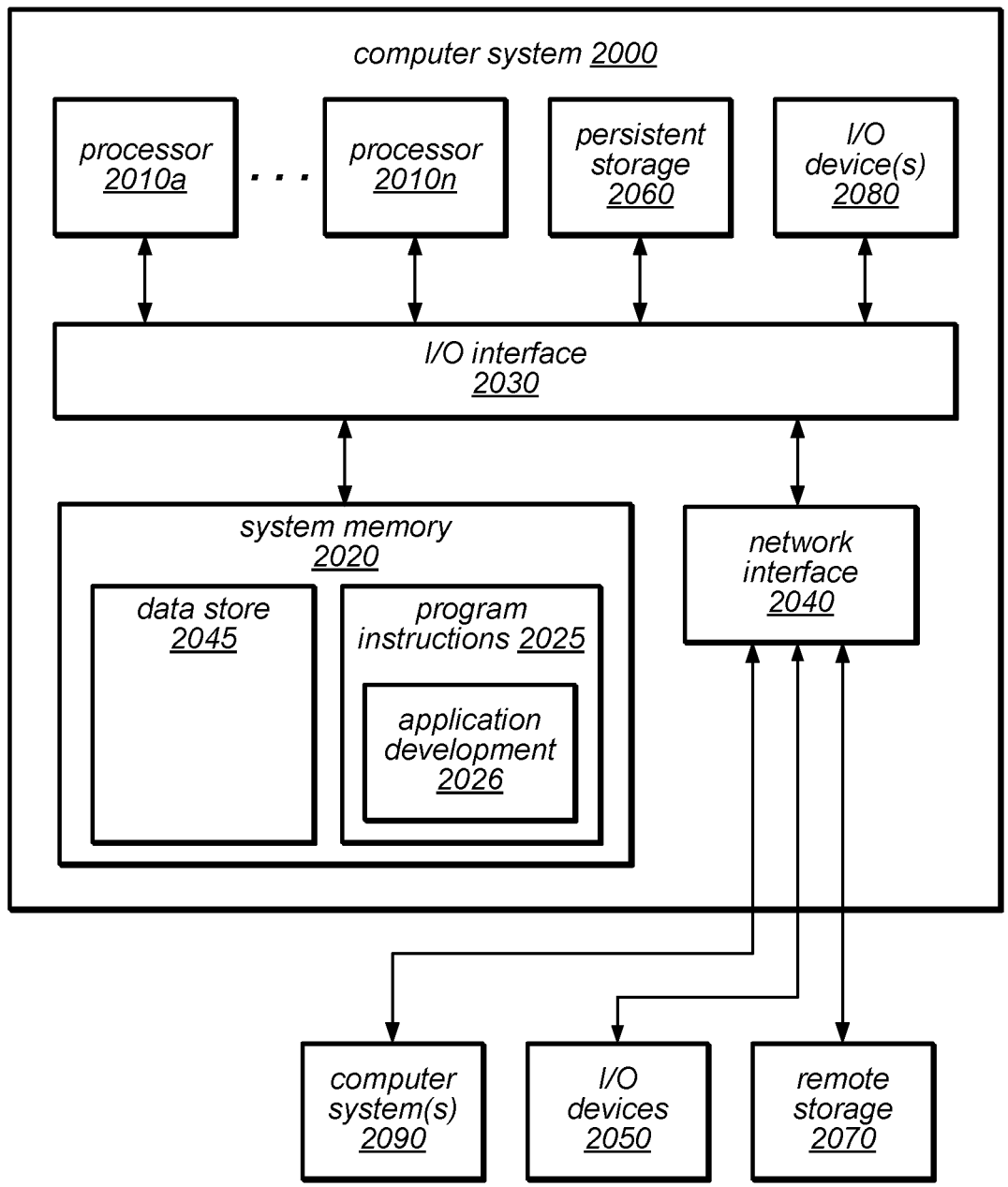
FIG. 6 is a block diagram illustrating an example computer system, according to various embodiments.

Various ones of the illustrated embodiments may include one or more computer systems 2000 such as that illustrated in FIG. 6 or one or more components of the computer system 2000 that function in a same or similar way as described for the computer system 2000.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030. In some embodiments, computer system 2000 may be illustrative of servers implementing enterprise logic or downloadable applications, while in other embodiments servers may include more, fewer, or different elements than computer system 2000.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the embodiments described herein. In another example, an instance of a server application executing on computer system 2000 may use network interface 2040 to communicate with other instances of the server application (or another server application) that may be implemented on other computer systems (e.g., computer systems 2090).

System memory 2020 may store instructions and data accessible by processor 2010. In various embodiments, system memory 2020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques as described above for providing a web browser, as indicated at 2026, are shown stored within system memory 2020 as program instructions 2025. In some embodiments, system memory 2020 may include data store 2045 which may be configured as described herein.

In some embodiments, system memory 2020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 2000 via I/O interface 2030. A computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as between a client device and other computer systems, or among hosts, for example. In particular, network interface 2040 may allow communication between computer system 800 and/or various other device 2060 (e.g., I/O devices). Other devices 2060 may include scanning devices, display devices, input devices and/or other communication devices, as described herein. Network interface 2040 may commonly support one or more wireless networking protocols (e.g., Wi-Fi/IEEE 802.7, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 2000, including one or more processors 2010 and various other devices (though in some embodiments, a computer system 2000 implementing an I/O device 2050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 2000. In general, an I/O device (e.g., cursor control device, keyboard, or display(s) may be any device that can communicate with elements of computing system 2000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Embodiments of decentralized application development and deployment as described herein may be executed on one or more computer systems, which may interact with various other devices. FIG. 6 is a block diagram illustrating an example computer system, according to various embodiments. For example, computer system 2000 may be configured to implement nodes of a compute cluster, a distributed key value data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of compute node, computing node, or computing device.

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may be a storage host, and persistent storage 2060 may include the SSDs attached to that server node.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   a client computing device comprising at least one processor and a memory configured to:
      request creation of an application resource in a network-based service; and
      execute a client application configured to:
         send, over a network to a session manager via a first bidirectional communications pipeline, a request to execute an agent comprising an interface coupling to the application resource; and
         create a second bidirectional communications pipeline, different from the first bidirectional communications pipeline, implemented using a websocket interface between the client application and the executing agent according to connection information received from the session manager, wherein the connection information comprises a websocket address of the agent, and wherein, subsequent to the creating, the agent provides access to the application resource for the client application via the second bidirectional communications pipeline; and
   a computing device comprising at least one processor and a memory implementing the session manager configured to:
      initiate execution of the agent responsive to receiving the request to execute an agent; and
      return to the client application the connection information for the executing agent.

2. The system of claim 1, wherein the client application is a web application executing within a web browser on the client computing device, and wherein the connection information comprises a websocket address.

3. The system of claim 2, wherein the client application is an integrated development environment application, wherein the network-based service is an application development service, and wherein the session manager is provided as part of the application development service of a provider network.

4. The system of claim 3, the session manager further configured to:
   receive, prior to receiving the request to execute the agent, the request to create the application resource from another application executing in the web browser, and responsive to receiving the creation request:
      create the application resource in the application development service; and
      redirect the web browser to execute the integrated development environment application.

5. A method, comprising:
   receiving, at a session manager, a request for creation of application resource in a network-based service;
   receiving, at the session manager from an application, a request to execute an agent comprising an interface coupling to the application resource, the request received over a first bidirectional communications pipeline of an interactive shell between the application and the session manager over a network;
   initiating execution of the agent responsive to receiving the request; and
   creating a second bidirectional communications pipeline, different from the first bidirectional communications pipeline, implemented using a web socket interface between the application and the executing agent, wherein, subsequent to the creating, the agent provides access to the application resource for the client application via the second bidirectional communications pipeline.

6. The method of claim 5, wherein initiating execution of the agent further comprises returning, over the first bidirectional communications pipeline to the application, connection information for the executing agent, and wherein creating the second bidirectional communications pipeline is performed, by the application, according to the returned connection information.

7. The method of claim 5, wherein the connection information comprises a websocket address of the agent.

8. The method of claim 5, wherein the application is a web application executing within a web browser on a client computing device.

9. The method of claim 5, wherein the agent and the session manager execute on different respective computing devices.

10. The method of claim 5, wherein the application is an integrated development environment application, wherein the network-based service is an application development service, and wherein the session manager is provided as part of the application development service of a provider network.

11. The method of claim 10, further comprising:
   receiving, prior to receiving the request to execute the agent, the request to create the application development resource from an application executing in a web browser, and responsive to receiving the creation request:
   creating the application resource in the application development service; and
   redirecting the web browser to execute the integrated development environment application.

12. The method of claim 11, wherein the agent comprises an interface coupling the application development resource and the integrated development environment application.

13. The method of claim 12, wherein the interface coupling the application development resource and the integrated development environment application comprises one or more custom interfaces to data of the application development resource specific to an application being developed using the application development resource.

14. One or more non-transitory computer-accessible storage media storing program instructions that when executed on or across one or more computing devices cause the one or more computing devices to implement a session manager to perform:
   receiving a request for creation of application resource;
   receiving, from an application, a request to execute an agent comprising an interface coupling to the application resource, and responsive to receiving the request:
      initiating execution of the agent, wherein the executing agent provides access to the application resource for the application; and
      returning, to the application, connection information comprising a websocket address for the executing agent.

15. The one or more non-transitory computer-accessible storage media of claim 14, wherein the application is a web application executing within a web browser on a client computing device.

16. The one or more non-transitory computer-accessible storage media of claim 14, wherein the agent and the session manager execute on different respective computing devices.

17. The one or more non-transitory computer-accessible storage media of claim 14, wherein the application is an integrated development environment application, and wherein the session manager is provided as part of an application development service of a provider network.

18. The one or more non-transitory computer-accessible storage media of claim 17, wherein the program instructions that when executed on or across one or more computing devices cause the session manager to further perform:
   receiving, prior to receiving the request to execute the agent, the request to create the application resource from an application executing in a web browser, and responsive to receiving the creation request:
      creating of the application resource in the application development service; and
      redirecting the web browser to execute the integrated development environment application.

19. The one or more non-transitory computer-accessible storage media of claim 18, wherein the agent comprises an interface coupling the application development resource and the integrated development environment application.

20. The one or more non-transitory computer-accessible storage media of claim 18, wherein the interface coupling the application development resource and the integrated development environment application comprises one or more custom interfaces to data of the application development resource specific to an application being developed using the application development resource.

* * * * *